United States Patent
Bhuyan et al.

(10) Patent No.: US 11,089,383 B2
(45) Date of Patent: Aug. 10, 2021

(54) METHOD AND SYSTEM FOR PRIORITIZING TARGETED ADVERTISEMENTS

(71) Applicant: ARRIS Enterprises LLC, Suwanee, GA (US)

(72) Inventors: Sudeepta Bhuyan, Bangalore (IN); Epari Aurovind Sagar, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/706,299

(22) Filed: Sep. 15, 2017

(65) Prior Publication Data
US 2019/0090030 A1    Mar. 21, 2019

(51) Int. Cl.
| | |
|---|---|
| *H04N 21/81* | (2011.01) |
| *H04N 21/442* | (2011.01) |
| *H04N 21/234* | (2011.01) |
| *H04N 21/643* | (2011.01) |
| *H04N 21/436* | (2011.01) |
| *H04N 21/45* | (2011.01) |
| *H04W 84/12* | (2009.01) |
| *H04W 88/08* | (2009.01) |

(Continued)

(52) U.S. Cl.
CPC ....... *H04N 21/812* (2013.01); *G06Q 30/0269* (2013.01); *G06Q 30/0272* (2013.01); *H04N 21/23424* (2013.01); *H04N 21/4126* (2013.01); *H04N 21/43615* (2013.01); *H04N 21/44218* (2013.01); *H04N 21/458* (2013.01); *H04N 21/4524* (2013.01); *H04N 21/6125* (2013.01); *H04N 21/643* (2013.01); *H04W 84/12* (2013.01); *H04W 88/08* (2013.01)

(58) Field of Classification Search
CPC ............. H04N 21/812; H04N 21/6125; H04N 21/44218; H04N 21/23424; H04N 21/643; H04N 21/4126; G06Q 30/0269; G06Q 30/0272; H04W 88/08; H04W 84/12
See application file for complete search history.

(56) References Cited

U.S. PATENT DOCUMENTS

| | | | |
|---|---|---|---|
| 5,966,696 A | 10/1999 | Giraud et al. | |
| 9,009,753 B2 | 4/2015 | Agarwal et al. | |

(Continued)

*Primary Examiner* — Benjamin R Bruckart
*Assistant Examiner* — Akshay Doshi
(74) *Attorney, Agent, or Firm* — Buchanan, Ingersoll & Rooney PC

(57) ABSTRACT

A method, device, and system for prioritizing insertion of targeted advertisements within advertisement time slots of a video program are provided. CPE detects whether or not an electronic personal device of a viewer of the video program is within a pre-defined viewing range of a display of the video program while the video program is being played and thereafter determines whether or not a detected electronic personal device remains within the viewing range during an advertisement time slot within the video program during the playing of a targeted advertisement. The CPE is configured to increase a priority of insertion of a previously played targeted advertisement within a next or subsequent advertisement time slot within the video program if the electronic personal device of the viewer is determined not to remain within the viewing range during the previous playing of the targeted advertisement.

17 Claims, 3 Drawing Sheets

(51) Int. Cl.
  *H04N 21/61* (2011.01)
  *H04N 21/41* (2011.01)
  *G06Q 30/02* (2012.01)
  *H04N 21/458* (2011.01)

(56) References Cited

U.S. PATENT DOCUMENTS

| | | |
|---|---|---|
| 2005/0097595 A1 | 5/2005 | Lipsanen et al. |
| 2010/0153983 A1 | 6/2010 | Philmon et al. |
| 2011/0178880 A1* | 7/2011 | Karaoguz ............. G06Q 30/02 705/14.73 |
| 2012/0088487 A1* | 4/2012 | Khan .................... H04W 4/021 455/418 |
| 2013/0314605 A1* | 11/2013 | Minemura ............... H04N 5/38 348/723 |
| 2015/0249512 A1* | 9/2015 | Adimatyam ........... H04H 20/12 725/107 |
| 2015/0348129 A1* | 12/2015 | Inoue .................... G06Q 30/02 705/14.66 |
| 2017/0099573 A1* | 4/2017 | Sawada .................... G01S 5/02 |

* cited by examiner

METHOD AND SYSTEM FOR PRIORITIZING TARGETED ADVERTISEMENTS

BACKGROUND

Media service providers typically provide, transmit, or stream media content and programs to viewers. The content or programs may include a plurality of separate and spaced-apart time slots within and during the playing or playback of the content for insertion of advertisements and like information. Advertisements for insertion are often selected and specifically targeted to be displayed to a viewer or group of viewers known or expected to have predetermined characteristics. For example, a particular advertisement may be selected based on the expected viewership of particular content, the geographic location of the viewer, or the age, gender, past viewing habits, or other known information of the viewer or viewers of the content.

In the case of delivering targeted advertisements to a viewer of media content being consumed in a home or like setting, it is expected that one or more viewers of the content may move away from the television or like display screen during at least some of the breaks in the program, such as when a targeted advertisement inserted into the program stream is displayed. In this case, despite the fact the advertisement was selected such that it is specifically targeted to the viewer, the effectiveness of the targeted advertisement is completely lost as it remains unwatched by the viewer.

Accordingly, simple delivery and display of advertising information during a given ad slot within a program or other media content is no guarantee of the effectiveness of the advertising information in reaching potential targeted consumers and impacting the market for the product or service being promoted. Thus, there exists a need for a method, system, and device that is able to determine viewer exposure to an advertisement and to prioritize the insertion of such advertisements in such ad slots based on this information.

SUMMARY

Thus, according to an embodiment, a method of prioritizing insertion of targeted advertisements within advertisement time slots of a video program is provided. The method comprises a step of detecting whether or not an electronic personal device of a viewer of the video program is within a pre-defined viewing range of a display of the video program while the video program is being played. The method also comprises a step of determining whether or not an electronic personal device detected during the above referenced detecting step remains within the viewing range during an advertisement time slot within the video program during the playing of a targeted advertisement. The method further comprises a step of increasing a priority of insertion of the targeted advertisement within a next or subsequent advertisement time slot within the video program if the electronic personal device of the viewer detected during the above referenced detecting step is determined not to remain within the viewing range during the above referenced determining step.

According to another embodiment, a device for prioritizing insertion of targeted advertisements within advertisement time slots of a video program is provided. The device comprises customer premises equipment (CPE) configured to detect whether or not an electronic personal device of a viewer of the video program is within a pre-defined viewing range of a display of the video program while the video program is being played, to determine whether or not a previously detected electronic personal device remains within the viewing range during an advertisement time slot within the video program during the playing of a targeted advertisement, and to increase a priority of insertion of the targeted advertisement within a next or subsequent advertisement time slot within the video program if the previously detected electronic personal device of the viewer is determined to not remain within the viewing range during the playing of the targeted advertisement.

According to another embodiment, a system for prioritizing insertion of targeted advertisements within advertisement time slots of a video program is provided. The system includes an electronic personal device of a viewer of the video program connected to a Wi-Fi network. The electronic personal device is selected from the group consisting of a smartphone, smartwatch, tablet computer, lap-top computer, and wearable device. The system also includes customer premises equipment (CPE) connected to the Wi-Fi network and configured to detect whether or not an electronic personal device of a viewer of the video program is within a pre-defined viewing range of a display of the video program while the video program is being played, to determine whether or not an electronic personal device detected to be within the pre-defined viewing range of the display of the video program while the video program is being played remains within the viewing range during an advertisement time slot within the video program during the playing of a targeted advertisement, and to increase a priority of insertion of the targeted advertisement within a next or subsequent advertisement time slot within the video program if the electronic personal device of the viewer is determined not to remain within the viewing range during the playing of the targeted advertisement.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
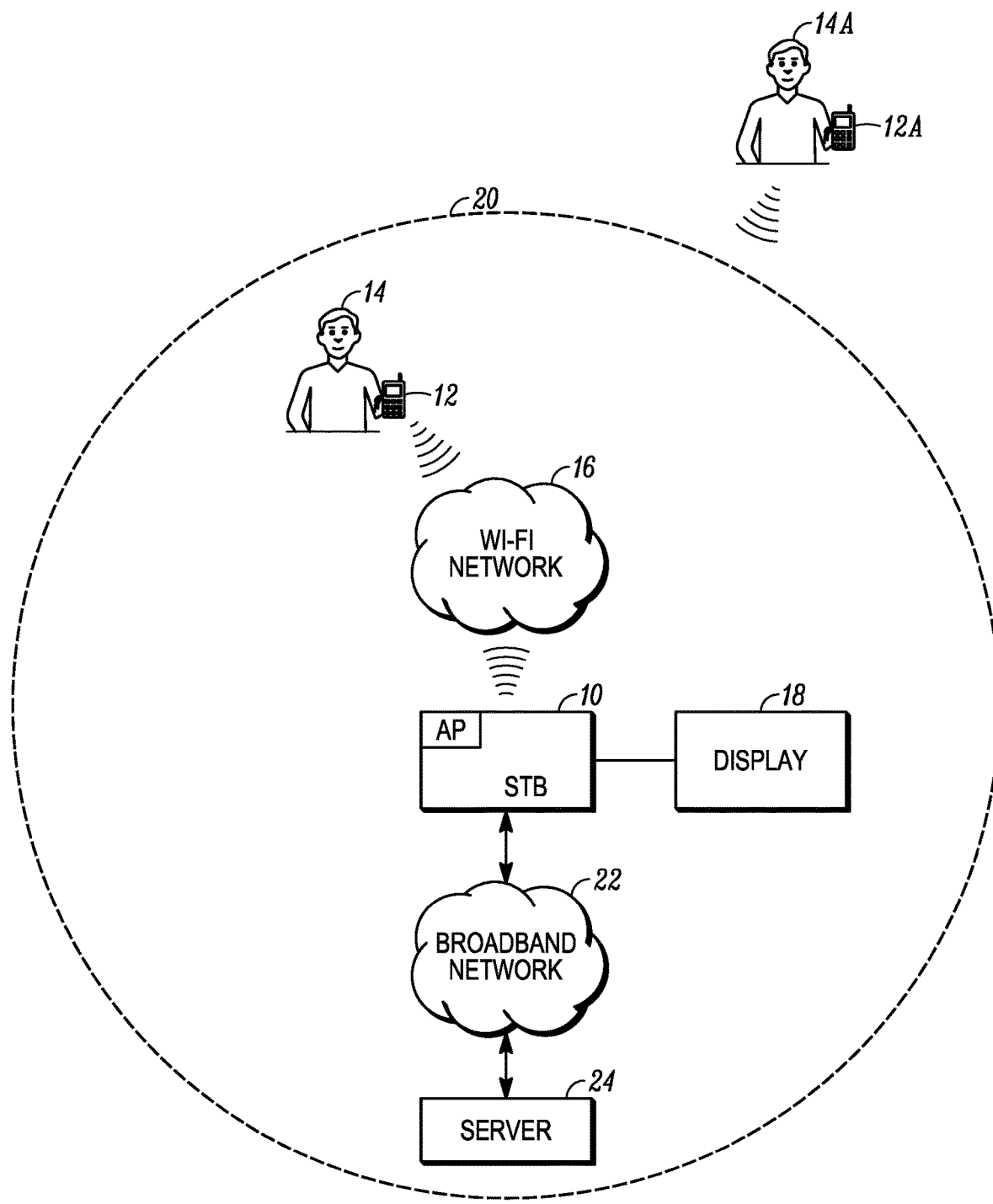
FIG. 1 is a schematic view of a system for prioritizing targeted advertisements in accordance to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments, methods, systems, and devices are provided which track the exposure of a particular viewer or viewers to particular promotional material, advertisements, targeted advertisements, or the like. These embodiments determine the presence or absence of a viewer or viewer within a pre-defined viewing range of content being presented by CPE, a display screen, or the like and utilize this information in prioritizing targeted advertisements to be selected for insertion within the next or subsequent advertising slots in the program.

For example, if it is determined that an advertisement inserted and played in a previous ad slot of the program was not actually viewed by the viewer (i.e., the advertisement remains "unwatched" by the viewer) since the viewer was determined not be present in the viewing area during the previous ad slot, the advertisement is marked or tagged as being unwatched so that the advertisement may be given a greater priority for insertion during a next or subsequent ad slot in the program to thereby enhance the effectiveness of ad delivery during the program by ensuring that an intended viewer was actually present and within viewing range during the presentation of a targeted advertisement.

Accordingly, the targeted ad system of embodiments disclosed herein automatically senses or determines whether a viewer is within a viewing range of a television, display screen, or the like during the playing of an advertisement or whether the viewer moved out of a pre-defined viewing range relative to the television, display screen, or the like during the playing of an advertisement. If the viewer relocated to a position outside of the viewing range, then the targeted advertisement(s) specifically directed to the viewer while the viewer remained outside of the viewing range is considered as not having been watched, viewed, or consumed by the viewer. With this information, the system is able to better prioritize unwatched advertisement(s) so that they may be inserted and re-played during the next or subsequent ad insertion time slot to increase the possibility of being viewed by the viewer.

In a similar manner, if the system determines that the viewer was positioned within the viewing range while a targeted advertisement was played during an ad slot within the program, then such a targeted advertisement is deemed viewed by the viewer and is not tagged or provided with any enhanced priority. Thus, other targeted advertisements would be played before the viewed targeted advertisement may be cued to be replayed.

For purposes of determining the proximity of a viewer relative to a television, display screen, or the like, customer premise equipment (CPE) may be configured to determine and/or calculate the proximity of a viewer to the television, display screen, or the like during the playing or playback of a program and ad slots therein. The customer premise equipment (CPE) may be, for instance, a set-top box (STB), Wi-Fi (wireless) capable STB, media gateway, IP enabled media gateway or set-top box, television, gaming module, computer, laptop computer, tablet, smartphone, or the like. As used herein, the term set-top box (STB) is not intended to be limited to the structure of a box or be located on top of another device, such as a television set. A set-top box (STB) may take any form and be placed at any location within a customer site.

According to an embodiment, the CPE, such as a Wi-Fi capable STB, and an electronic personal device (i.e., a smartphone, smartwatch, tablet computer, lap-top computer, wearable device, or the like) of a viewer are connected to the same local Wi-Fi (wireless) network at the customer premises. For example, the CPE or STB itself may provide a Wi-Fi Access Point (AP) or both the CPE or STB and the personal device may be connected to the same Wi-Fi router (not shown, which may be or form a part of another CPE). This connection may be used to determine if the viewer (with his/her personal device) is sufficiently close to the television, display device, or the like to be considered within a pre-defined viewing area.

According to an embodiment, if the proximity of the viewer is determined to be more than a recommended value or distance from the viewing screen or device (i.e., television screen or other display screen) while a targeted advertisement is being displayed, the advertisement is marked or tagged as "unwatched" by the CPE. This "unwatched" advertisement is thereafter given a higher priority for insertion in upcoming ad slots so that it may be replayed during the next or a subsequent ad insertion time slot within the program. Due to the heightened priority, the replaying of an advertisement marked as "unwatched" will be advanced relative to other advertisements to a slot significantly earlier in a program in comparison to an advertisement considered to have been viewed by the intended viewer. In this manner, the system better ensures that intended target advertisements are viewed by the intended viewer and do not simply remain unviewed.

By way of example, the embodiment shown in FIG. 1 includes a Wi-Fi capable STB 10 having targeted advertisement hardware and/or software and a viewer 14 of a video program or other media content having a personal device 12. The personal device 12 may be, for instance, a smartphone, smartwatch, fitness band, or personal wearable device which connects to and is part of the same Wi-Fi network 16 as the STB 10. According to the illustrated embodiment, the STB 10 may provide a Wi-Fi Access Point (AP) to which the viewer's personal device 14 is directly connected. As an alternative, the STB may not provide an AP; rather, the STB and personal device may simply be connected to the same Wi-Fi network such as provided by a Wi-Fi router or other CPE.

The STB 10 may determine that the personal device (and hence, the viewer) is within the proximity of the STB 10 or a display screen 16 or within a pre-defined viewing area 20 if the personal device 12 is detected to be within a particular distance from the STB 10 or other CPE. The distance value may be configurable by the viewer and may be, as an example, about 10 meters (32.8 feet). As another alternative, the STB 10 may determine that the personal device 14 (and hence, the viewer) is within the proximity of the STB 10 or display screen 18 or within the pre-defined viewing area 20 if a round-trip time (RTT) of a TCP packet between the STB 10 or other CPE and the personal device 12 is less than a pre-defined threshold value (for example, 1 millisecond). Of course, this determination may be provided based on a combination of the above and/or by different techniques.

By way of example, the personal device 12 as shown in FIG. 1 is within a distance from the display 18 to be considered in a position for the viewer 14 to readily view content and advertisements. In contrast, the personal device 12a of the viewer 14a is sufficiently spaced from the display 18 to be considered not in position to consume content or advertisements displayed on the display 18.

According to an embodiment, the STB or CPE may use the following techniques to determine proximity. The STB or other CPE may monitor TCP RTT (Round Trip Time) between itself and the personal device for regular/existing traffic. Alternatively, the STB or other CPE may explicitly calculate RTT by pinging the personal device, or, if the personal device supports 802.11k reports, the STB or other CPE may fetch a LCI (Location Configuration Information) report from the personal device. The LCI can be used to approximately calculate the distance from the STB to the personal device. Of course, the determination may be provided based on a combination of the above and/or by different techniques. At least some of the above referenced determinations and/or calculations may be performed by the STB or other CPE or by a separate server 24 (local, remote, or cloud) with which the STB 10, gateway, or other CPE communicates via a broadband network 22 or the like.

Figure 2:
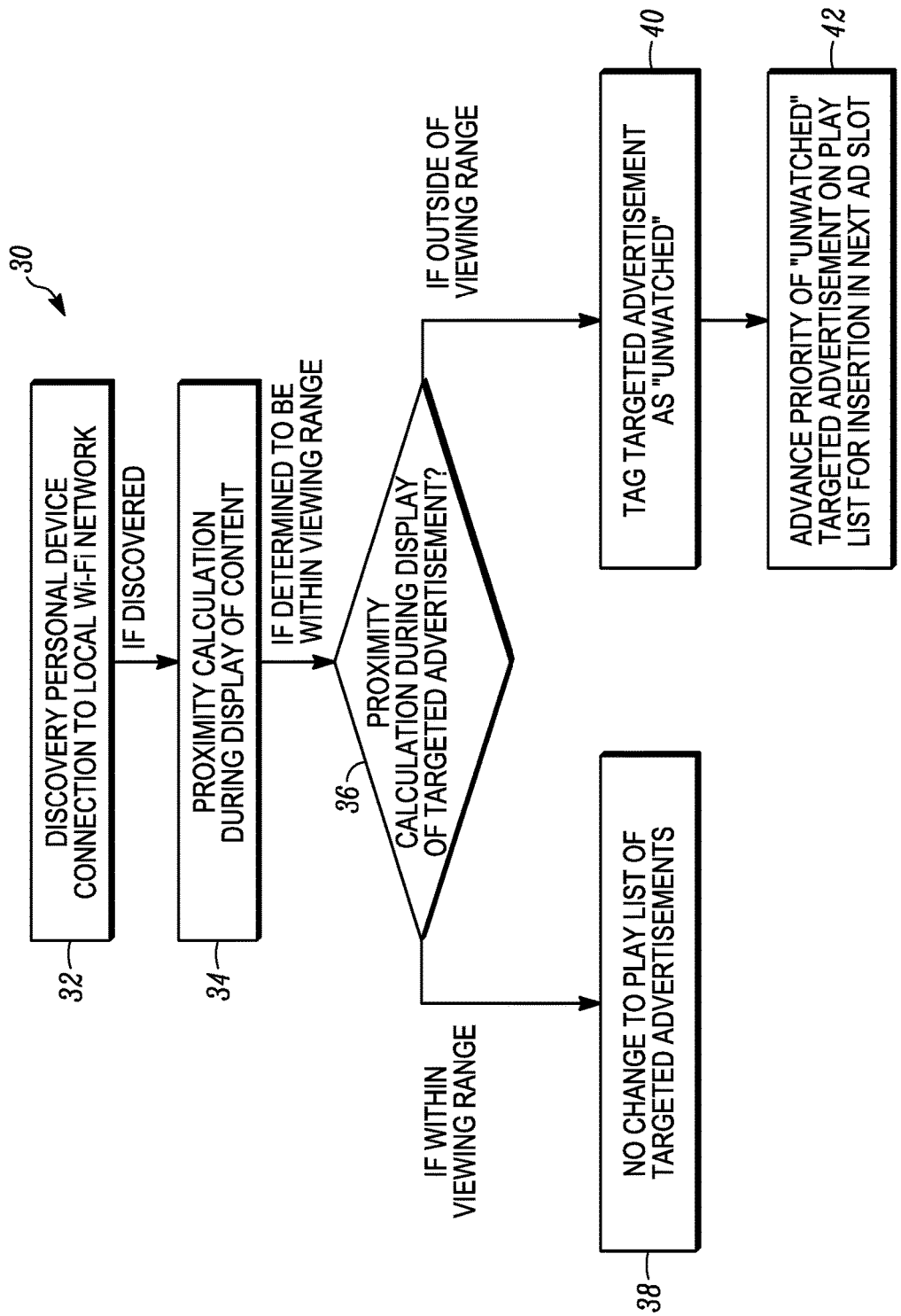
FIG. 2 is a flow chart of a process of prioritizing targeted advertisements in accordance to an embodiment.

As best shown in the flow chart 30 of FIG. 2, for purposes of performing a personal device discovery and initial proximity calculation, whenever the STB 10 is active (i.e. displaying video of a program or content via a TV screen 18 or the like), the STB 10 may check whether there are any personal devices connected to the local Wi-Fi network 16 (see step 32). If personal devices are detected as being connected to the local Wi-Fi network 16, the STB 10, gateway, or other CPE may attempt to determine if any of the connected devices are within its proximity using any of the methods described above (see step 34). In this manner, the STB 10 acquires knowledge of the viewer or viewers watching a program currently being played on the display screen 18.

Thereafter, for purposes of performing a proximity calculation of a viewer or viewer (having been previously detected as being present during the playing of a program) during the playing or playback of a targeted advertisement in an ad slot, the STB 10 attempts to periodically recalculate the proximity of the viewer's personal device using any of the methods described above (see step 36). If the proximity of the device is found to be more than the recommended distance (for instance, 10 m), the STB may determine that the viewer moved outside of the viewing range of the targeted advertisement (i.e., see viewer 14a and device 12a in FIG. 1). Accordingly, in this case, the STB causes the currently playing targeted advertisement to be tagged as "unwatched" (see step 40) thereby advancing the priority of the advertisement for insertion in subsequent ad slots in the program. Thus, during the next or a subsequent ad slot for targeted ads within the program, the STB may first display the targeted advertisements which have been previously marked as "unwatched" (see step 42). Alternatively, if the personal device of the viewer remained within proximity of the STB 10 such that the viewer is considered as having watched the targeted advertisement, no change is made to the current play list and priority of playing targeted advertisements (see step 38).

Figure 3:
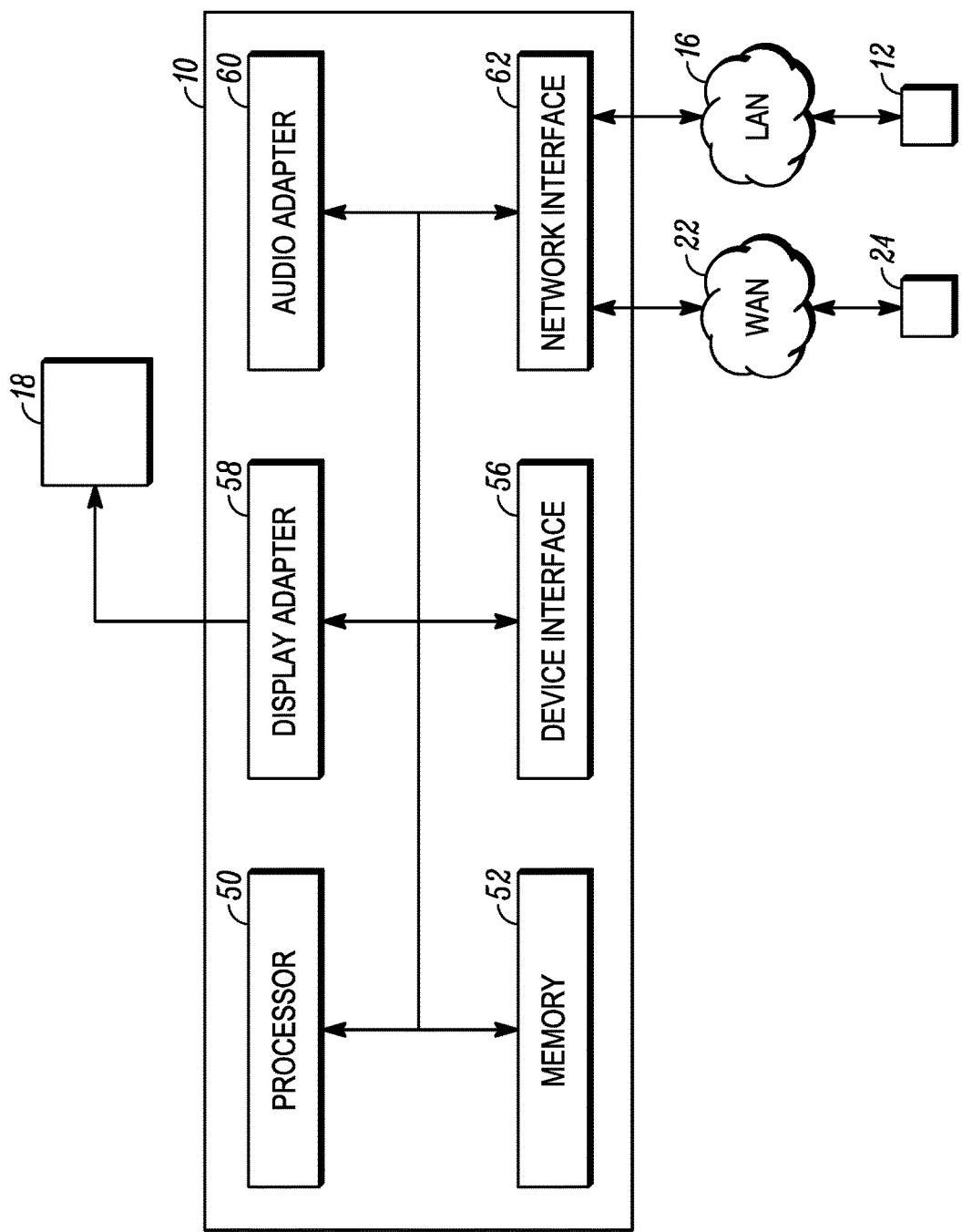
FIG. 3 is a block diagram of components of a set-top box in accordance to an embodiment.

FIG. 3 provides a functional block diagram of an exemplary embodiment of the STB 10 shown in FIG. 1. The STB 10 may include a general computing platform illustrated as including at least one processor 50 and at least one memory element 52 that may be integrated with each other or, communicatively connected over a bus or similar interface. The processor 50 may be a variety of processor types including microprocessors, micro-controllers, programmable arrays, custom IC's, and the like and may also include single or multiple processors with or without accelerators or the like. The memory element of 52 may include a variety of structures, including but not limited to RAM, ROM, magnetic media, optical media, bubble memory, FLASH memory, EPROM, EEPROM, and the like. According to some embodiments, these components may be responsible for receiving and storing advertisements, prioritizing the insertion of advertisements in a content or program stream, and inserting the advertisements into ad slots within a content stream.

The processor 50 may interface to a variety of elements including, but not limited to, a device interface 56, a display adapter 58, audio adapter 60, and one or more network interfaces 62. The device interface 56 provides an interface to external controls, such as remote controllers, sensors, actuators, or the like. The display adapter 58 can be used to drive a variety of content display elements, such as display device 18, and the audio adapter may drive a speaker or the like.

The network interface 62 may interface the computing platform of the STB 10 to other devices via network connections. For instance, at least one network interface 62 may be configured to connect the STB 10 to a local Wi-Fi network 16 and may be configured to provide an Access Point for the local Wi-Fi network 16. In this manner, the STB 10 and a personal device 12 may interact via connection to the local Wi-Fi network 16.

At least one network interface 62 or other network interface may be configured to connect the STB 10 to a broadband network 22 or the like in communication with a head end of a service provider network, a wide area network, a global network such as the Internet, or the like. In this manner, the STB 10 may receive content or program streams and advertisements for insertion within the content or program streams. Alternatively, the STB 10 may communicate with a server 24 to transfer data concerning unwatched advertisements and to receive content streams with advertisements inserted therein.

A system for carrying out any of the above disclosed methods or arrangements may include software or the like provided on a circuit board or within another electronic device and can include various processors, microprocessors, modules, units, components, controllers, chips, disk drives, and the like. It will be apparent to one of ordinary skill in the art that systems, modules, components, units, processors, servers, and the like may be implemented as electronic components, software, hardware or a combination of hardware and software for purposes of providing a system.

Embodiments may also include at least one non-transitory computer readable storage medium having computer program instructions stored thereon that, when executed by at least one processor, can cause the at least one processor to perform any of the steps described above.

While the principles of the invention have been described above regarding specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims.

We claim:

1. A method for prioritizing insertion of targeted items of streamed media content within advertisement time slots of a video program, the method comprising steps of:

receiving, from a media service provider network, streamed media content, the streamed media content including a video program stream and at least one targeted item of streamed media content for insertion within one or more advertisement time slots of the video program stream;

determining a location of an electronic personal device of a viewer of the video program stream, the location being in relation to a display of the video program stream;

detecting, at a time while the video program is being streamed, whether the electronic personal device is detectably present within a pre-defined viewing range of the display of the video program stream;

determining, based on a result of the detecting, whether the electronic personal device was detectably present within the viewing range during a playing of the targeted item of streamed media content within one of the one or more of the advertisement time slots of the video program stream;

based upon a result of the determining, increasing a priority of insertion of the targeted item of streamed media content within a next or subsequent advertisement time slot within the video program stream if the result indicates that the electronic personal device of the viewer detected during said detecting step has not been determined to have been detectably present within the viewing range during said determining step; and inserting the targeted item of streamed media content ahead of non-targeted items of streamed media content within the next or subsequent advertisement time slot within the video program stream;

wherein during at least one of said detecting and determining steps, an 802.11k LCI report is used to approximate a distance to the personal device from the CPE.

2. The method according to claim 1, wherein said pre-defined viewing range of the display of the video program stream is defined by a proximity of the personal device of the viewer to customer premises equipment (CPE).

3. The method according to claim 2, wherein the CPE is connected to a local Wi-Fi network to which the personal device is connected.

4. The method according to claim 3, further comprising the step of identifying a personal device connected to the local Wi-Fi network before said detecting step.

5. The method according to claim 2, wherein the CPE is a set-top box (STB).

6. The method according to claim 5, wherein the STB is a Wi-Fi capable STB providing an Access Point (AP) to a local Wi-Fi network, and wherein the personal device is connected to the local Wi-Fi network via the AP provided by the STB.

7. The method according to claim 2, wherein the personal device is considered within the predefined viewing range if the proximity of the personal device of the viewer to the CPE is calculated to be within a predetermined distance.

8. The method according to claim 2, wherein the personal device is considered within the predefined viewing range if a round-trip time (RTT) of a TCP packet between the personal device and the CPE is less than a pre-determined time threshold.

9. The method according to claim 2, further comprising the step of pinging the personal device with the CPE during at least one of said detecting and determining steps.

10. The method according to claim 1, wherein during said increasing step, the targeted item of streamed media content is tagged as unwatched.

11. The method according to claim 1, wherein the electronic personal device is selected from the group consisting of a smartphone, smartwatch, tablet computer, lap-top computer, and wearable device.

12. A device for prioritizing insertion of targeted items of streamed media content within advertisement time slots of a video program, comprising customer premises equipment (CPE) including at least one processor configured to:

receive, from a media service provider network, streamed media content, the streamed media content including a video program stream and at least one targeted item of streamed media content for insertion within one or more advertisement time slots of the video program stream;

determine a location of an electronic personal device of a viewer of the video program stream, the location being in relation to a display of the video program stream;

use an 802.11k LCI report to approximate a distance to the personal device from the CPE;

detect, at a time while the video program is being streamed, whether the electronic personal device is detectably present within a pre-defined viewing range of the display of the video program stream;

periodically determine, based on a result of the detecting, whether or not the electronic personal device was detectably present within the viewing range during a playing of the targeted item of streamed media content within one of the one or more of the advertisement time slots of the video program stream;

increase, based upon a result of the determining, a priority of insertion of the targeted item of streamed media content within a next or subsequent advertisement time slot within the video program stream if the result indicates that the electronic personal device of the viewer has not been determined to have been detectably present within the viewing range during the playing of the targeted item of streamed media content; and insert the targeted item of streamed media content ahead of non-targeted items of streamed media content within the next or subsequent advertisement time slot within the video program stream.

13. The device according to claim 12, wherein the CPE has at least one network interface module configured to connect to a local Wi-Fi network to which the personal device is connected, and wherein said pre-defined viewing range of the display of the video program stream being defined by a proximity of the personal device of the viewer to the CPE.

14. The device according to claim 13, wherein the CPE is a set-top box (STB) positioned adjacent the display and having a display adapter for driving the display.

15. The device according to claim 14, wherein the STB is a Wi-Fi capable STB providing an Access Point (AP) to a local Wi-Fi network, and wherein the personal device is connected to the Wi-Fi network via the AP provided by the STB.

16. A system for prioritizing insertion of targeted items of streamed media content within advertisement time slots of a video program, comprising:

an electronic personal device of a viewer of the video program, the electronic personal device connected to a Wi-Fi network, said electronic personal device being selected from the group consisting of a smartphone, smartwatch, tablet computer, lap-top computer, and wearable device; and customer premises equipment (CPE) connected to the Wi-Fi network and configured to:

receive, from a media service provider network, streamed media content, the streamed media content including a video program stream and at least one targeted item of streamed media content for insertion within one or more advertisement time slots of the video program stream;

determine a location of an electronic personal device of a viewer of the video program stream, the location being in relation to a display of the video program stream;

use an 802.11k LCI report to approximate a distance to the personal device from the CPE;

detect, at a time while the video program is being streamed, whether the electronic personal device is detectably present within a pre-defined viewing range of the display of the video program stream;

periodically determine, based on a result of the detecting, whether or not the electronic personal device was detectably present within the viewing range during a playing of the targeted item of streamed media content within one of the one or more advertisement time slots of the video program stream;

increase, based upon a result of the determining, a priority of insertion of the targeted item of streamed media content within a next or subsequent advertisement time slot within the video program stream if the result indicates that the electronic personal device of the viewer has not been determined to have been detectably present within the viewing range during the playing of the targeted item of streamed media content; and insert the targeted item of streamed media content ahead of non-targeted items of streamed media content within the next or subsequent advertisement time slot within the video program stream.

17. The system according to claim 16, wherein the CPE is a Wi-Fi capable set-top box (STB) that provides an Access Point (AP) to the Wi-Fi network and that is positioned adjacent the display, and wherein the personal device is connected to the Wi-Fi network via the AP of the STB.

\* \* \* \* \*